(12) United States Patent
Bourdoulous

(10) Patent No.: US 10,280,765 B2
(45) Date of Patent: May 7, 2019

(54) ARTICLE WITH COATED SUBSTRATE

(71) Applicant: UNITED TECHNOLOGIES CORPORATION, Farmington, CT (US)

(72) Inventor: Robert P. Bourdoulous, Shelton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 271 days.

(21) Appl. No.: 15/036,012

(22) PCT Filed: Nov. 11, 2014

(86) PCT No.: PCT/US2014/064954
§ 371 (c)(1),
(2) Date: May 11, 2016

(87) PCT Pub. No.: WO2015/116292
PCT Pub. Date: Aug. 6, 2015

(65) Prior Publication Data
US 2016/0319679 A1    Nov. 3, 2016

Related U.S. Application Data

(60) Provisional application No. 61/902,540, filed on Nov. 11, 2013.

(51) Int. Cl.
| | |
|---|---|
| *F01D 5/28* | (2006.01) |
| *C23C 24/08* | (2006.01) |
| *C23C 30/00* | (2006.01) |
| *F01D 5/18* | (2006.01) |

(Continued)

(52) U.S. Cl.
CPC .............. *F01D 5/288* (2013.01); *C23C 24/08* (2013.01); *C23C 30/00* (2013.01); *F01D 5/186* (2013.01); *F01D 9/02* (2013.01); *F01D 11/08* (2013.01); *B23P 2700/06* (2013.01); *F05D 2220/32* (2013.01); *F05D 2230/13* (2013.01); *F05D 2230/31* (2013.01); *F05D 2230/90* (2013.01);

(Continued)

(58) Field of Classification Search
None
See application file for complete search history.

(56) References Cited

U.S. PATENT DOCUMENTS

| | | |
|---|---|---|
| 4,109,031 A | 8/1978 | Marscher |
| 4,503,130 A | 3/1985 | Bosshart et al. |
| 5,284,698 A | 2/1994 | Marshall et al. |

(Continued)

FOREIGN PATENT DOCUMENTS

| | | |
|---|---|---|
| EP | 605196 A1 | 7/1994 |
| EP | 0926257 | 6/1999 |

(Continued)

OTHER PUBLICATIONS

Extended European Search Report for European Patent Application No. 14881296.9 completed May 30, 2017.

*Primary Examiner* — Michael P. Rodriguez
(74) *Attorney, Agent, or Firm* — Carlson, Gaskey & Olds, P.C.

(57) ABSTRACT

One exemplary embodiment of this disclosure relates to a method for coating a substrate. The method includes heating a substrate, depositing a coating on the heated substrate, and forming an expansion slit in the coating.

10 Claims, 1 Drawing Sheet

(51) Int. Cl.
*F01D 9/02* (2006.01)
*F01D 11/08* (2006.01)

(52) U.S. Cl.
CPC ...... *F05D 2300/10* (2013.01); *F05D 2300/20* (2013.01); *F05D 2300/611* (2013.01)

(56) References Cited

U.S. PATENT DOCUMENTS

| | | | |
|---|---|---|---|
| 5,681,616 A * | 10/1997 | Gupta | C23C 4/02 427/264 |
| 6,511,762 B1 | 1/2003 | Lee et al. | |
| 6,524,395 B1 * | 2/2003 | Devine, II | B08B 3/02 134/18 |
| 7,258,934 B2 | 8/2007 | Wigren et al. | |
| 7,892,652 B2 | 2/2011 | Stock et al. | |
| 2003/0049470 A1 | 3/2003 | Maloney | |
| 2003/0059633 A1 * | 3/2003 | Ackerman | C23C 2/26 428/472 |
| 2003/0129417 A1 | 7/2003 | Chen et al. | |
| 2003/0207079 A1 * | 11/2003 | Subramanian | C23C 4/18 428/136 |
| 2005/0013994 A1 | 1/2005 | Strangman | |
| 2009/0017260 A1 | 1/2009 | Kulkarni et al. | |
| 2010/0136258 A1 | 6/2010 | Strock et al. | |
| 2012/0094029 A1 | 4/2012 | Halberstadt et al. | |
| 2012/0148769 A1 | 6/2012 | Bunker et al. | |
| 2012/0177840 A1 * | 7/2012 | Strock | C23C 4/02 427/535 |

FOREIGN PATENT DOCUMENTS

| | | |
|---|---|---|
| EP | 1752553 A2 | 2/2007 |
| EP | 1985723 A2 | 10/2008 |
| JP | 06226509 A | 8/1994 |

* cited by examiner

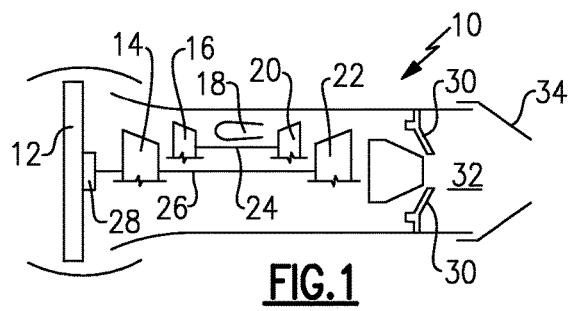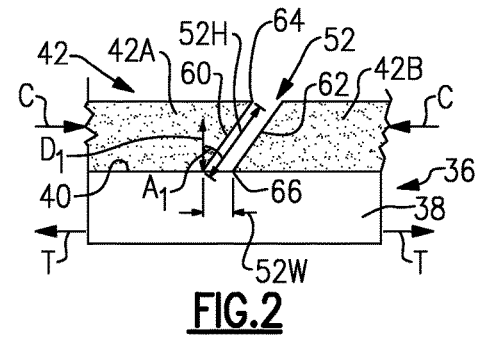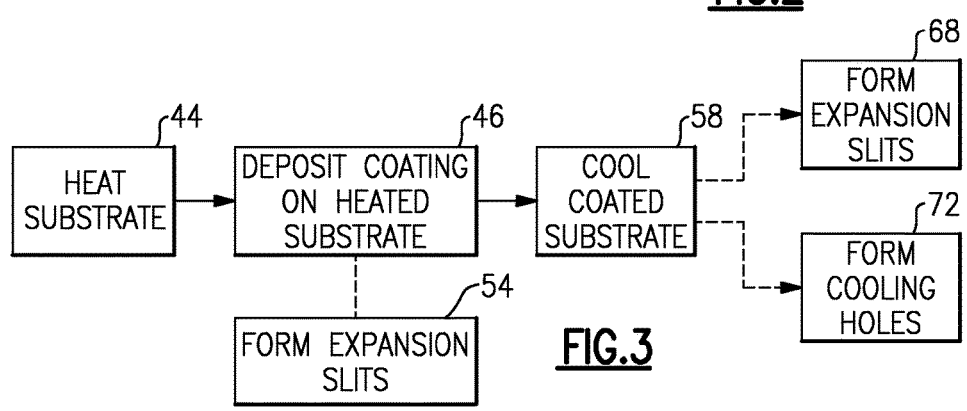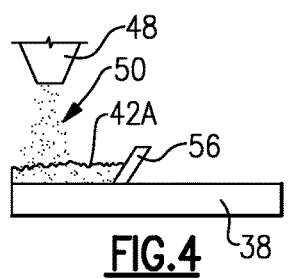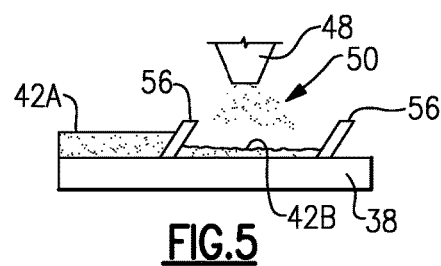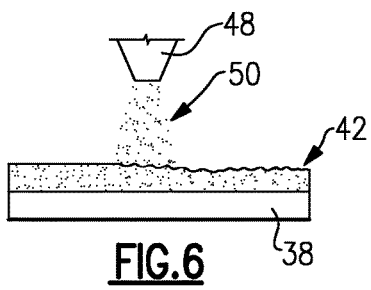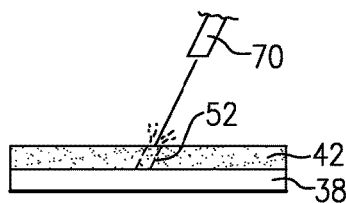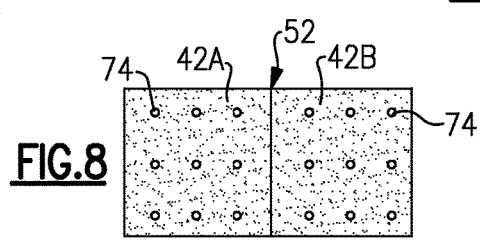

ARTICLE WITH COATED SUBSTRATE

BACKGROUND

Gas turbine engines include components that operate under relatively high temperatures. These components are often cooled with relatively cool air and/or are coated with a protective material. Some known components are coated with a ceramic coating, which is applied over an outer surface of the component.

SUMMARY

One exemplary embodiment of this disclosure relates to a method for coating a substrate. The method includes heating a substrate, depositing a coating on the heated substrate, and forming an expansion slit in the coating.

In a further embodiment of any of the above, the method includes cooling the coated substrate to prestress the coating.

In a further embodiment of any of the above, when the coated substrate is cooled, the coating is in compression.

In a further embodiment of any of the above, the coated substrate is cooled to about room temperature.

In a further embodiment of any of the above, the substrate is heated to an expected operating temperature while depositing the coating.

In a further embodiment of any of the above, the depositing step includes depositing a first section of coating and depositing a second section of coating adjacent the first section of coating, the expansion slit provided between the first section and the second section.

In a further embodiment of any of the above, the method includes providing a spacer extending upward from the substrate, the first section and the second section deposited on opposite sides of the spacer.

In a further embodiment of any of the above, the expansion slit is formed in the coating after the coating is deposited on the substrate.

In a further embodiment of any of the above, the expansion slit is formed using a laser cutting process.

In a further embodiment of any of the above, a height of the expansion slit is inclined relative to a direction normal to the substrate.

In a further embodiment of any of the above, the method includes forming cooling holes through the coated substrate at locations spaced from the expansion slit.

In a further embodiment of any of the above, the substrate includes a metallic material, and wherein the coating includes a ceramic material.

Another exemplary embodiment of this disclosure relates to an article for a gas turbine engine. The article includes a substrate, a coating on the substrate, and an expansion slit formed in the coating.

In a further embodiment of any of the above, the expansion slit has a height inclined relative to a direction normal to the substrate.

In a further embodiment of any of the above, the expansion slit is provided between a face of a first section of the coating, and a face of a second section of the coating, and wherein an outermost point of the face of the first section overlaps an innermost face of the second section.

In a further embodiment of any of the above, the coating includes a plurality of expansion slits.

In a further embodiment of any of the above, the article includes cooling holes extending through both the coating and the substrate at locations spaced from the expansion slit.

In a further embodiment of any of the above, the coating includes a ceramic material, and wherein the substrate includes a metallic material.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 1 schematically illustrates an example gas turbine engine.

FIG. 2 illustrates an article having a coated substrate.

FIG. 3 is a flow chart representing the steps associated with an example method according to this disclosure.

FIG. 4 illustrates a first section of coating being deposited on a substrate.

FIG. 5 illustrates a second section of coating being deposited on a substrate.

FIG. 6 illustrates a coating being deposited on a substrate.

FIG. 7 illustrates an expansion slit being formed in a coating.

FIG. 8 illustrates cooling holes formed in a coated substrate.

DETAILED DESCRIPTION

FIG. 1 schematically illustrates a gas turbine engine 10. In the example, the engine 10 includes a fan 12 configured to draw in fluid and generate thrust. The engine 10 further includes a low pressure compressor 14 and a high pressure compressor 16 configured to compress fluid for combustion in a combustor 18. The combusted fluid is expanded over a high pressure turbine 20 and low pressure turbine 22. In this example, the high pressure turbine 20 drives the high pressure compressor 16 by way of a high spool 24. Similarly, the low pressure turbine 22 drives the low pressure compressor 14 by way of the low spool 26. The fan 12 is also driven by the low spool 26. Optionally, the engine 10 may include a gear 28 to reduce the rotational speed of the fan 12 relative to the low spool 26. Also, while two spools 24, 26 are illustrated, this disclosure extends to single and three spool engines.

In this example, the engine 10 includes augmentor flameholders 30, followed by an augmentor 32 and a variable area exhaust nozzle 34. While the engine 10 in FIG. 1 has been illustrated as having a fan 12 and gear 28, engines (such as military, or low-bypass, engines) including flameholders 30, augmentors 32, and variable area exhaust nozzles 34 may exclude the fan 12 and gear 28. It should be understood that this disclosure extends to all types of engines, including low-bypass, high-bypass, etc.

Turning now to FIGS. 2-5, this disclosure relates to an article 36 for use in the gas turbine engine 10. In one example, the article 36 is an engine component, such as a rotor blade, stator vane, or a blade outer air seal (BOAS). This application further extends to articles such as flameholders, augmentors, variable area exhaust nozzles, and other engine structures.

With reference to FIG. 2, a representative portion of the article 36 is shown. The article 36 includes a substrate 38 having an outer surface 40, which is covered by a protective coating 42. In one example, the outer surface 40 is an outermost surface of the article 36, which may be a surface expected to be exposed to a hot gas flow path during operation of the gas turbine engine 10.

In one example, the article 36 and the substrate 38 are made of a metallic material, such as a superalloy. For example, superalloys can include Ni- and Co-based alloys. Inconel is one example family of Ni-based alloys. The coating 42, on the other hand, includes a material that has higher thermal resistance than the material of the substrate 38, such as a ceramic material. Ceramic material and metallic material have different coefficients of thermal expansion. In particular, ceramic material has a lower coefficient of thermal expansion than metallic material, meaning that ceramic material expands less than metallic material given the same change in temperature.

One example for providing the coating 42 onto the substrate 38 is illustrated in the flow chart of FIG. 3. Initially, at 44, the substrate 38 is heated. In one example, the substrate 38 is heated to a temperature corresponding to an expected temperature of the article 36 during normal operation of the engine 10 that still allows for effective deposition of the coating 42. One example temperature is about 800° F. (about 427° C.). Heating the substrate 38 results in expansion of the substrate.

In one example, the substrate is heated until it reaches equilibrium (e.g., for about 15 minutes). With the substrate 38 heated, the coating 42 is deposited on the substrate 38, at 46. As illustrated in the example of FIG. 4, a sprayer 48 is configured to deposit a ceramic material 50 onto the substrate 38. While a sprayer 48 is illustrated, this disclosure extends to other deposition techniques.

In one further example, the coating 42 can include expansion slits 52, as illustrated in FIG. 2. The expansion slits 52 may be formed during the depositing step, as illustrated at 54 (FIG. 3). As shown in FIG. 4, a spacer 56 extends upwardly from the substrate 38 to essentially separate the coating 42 into sections, with an expansion slit 52 between adjacent sections. The spacer 56 is essentially a negative of the expansion slit 52.

As illustrated in FIG. 4, a first section 42A of the coating 42 is applied on a first side of the spacer 56. As shown in FIG. 5, a second section 42B is deposited on the opposite side of the spacer 56. While only two sections 42A, 42B of the coating 42 are illustrated, it should be understood that this disclosure extends to coatings having additional sections (and additional expansion slits 52).

After depositing the coating 42, at 46, the substrate 38 and the coating 42 (collectively the "coated substrate") is allowed to cool, at 58. After deposition and before cooling, the temperature of the coated substrate may be held for about 5 minutes, in one example, to ensure bonding. As the coated substrate cools, contraction of the substrate 38 is restricted by the coating 42. Thus, the substrate 38 will not reach its original size, and will be in tension (illustrated at T in FIG. 2). The coating 42, on the other hand, will be in compression (illustrated at C in FIG. 2) by virtue of the contraction of the substrate 38.

The spacers 56 may be removed after cooling. In one example, the coated substrate cools to about room temperature (i.e., about 70° F., or 21° C.). Cooling the coated substrate creates the tension T in the substrate 38, and applies a compressive prestress C to the coating 42, as illustrated at C in FIG. 2. In one example, the compressive prestress C is about 80 kpsi (about 552 MPa), which is approximately equal to the expected tensile stress the article 36 would undergo during normal engine operation. Thus, when the article 36 is placed in an engine 10 and exposed to high temperatures, the article 36 expands, which relieves the prestress C from the coating 42. Therefore, the coating 42 is less likely to crack or otherwise be damaged during operation of the engine 10.

The detail of the expansion slits 52 will now be explained with reference to FIG. 2. The expansion slit 52 has a length extending into the page (relative to FIG. 2), a width 52W, and a height 52H. In this example, the height 52H of the expansion slit 52 is inclined at an angle $A_1$ relative to a direction $D_1$ normal to the outer surface 40 of the substrate 38. In this example, the angle $A_1$ is nonzero.

The first section 42A includes a face 60 inclined at the angle $A_1$, and the second section 42B includes a face 62 which is also inclined at the angle $A_1$. The first face 60, at an outermost point 64 thereof, overlaps, in the direction $D_1$, an innermost point 66 of the second face 62. The overlap in the direction $D_1$ may be particularly useful when the article 36 is exposed (e.g., visible) from the exterior of the engine 10 (e.g., when the article 36 is an exhaust nozzle, or a housing adjacent a flameholder). In these instances, the overlap is useful for preventing direct exposure of the substrate 38, which may be a metallic material, to electromagnetic radiation. Ceramic material is relatively less reflective for electromagnetic radiation compared to metallic material, and the inclined slits 52 thus reduce the detectability by detection and ranging systems (e.g., RADAR).

The expansion slit 52 allows for relative movement between the first and second sections 42A, 42B. This relative movement may be caused by bending, vibration, and/or thermal expansion of the article 36. Further, should one of these sections 42A, 42B fail (e.g., crack, unzip from the substrate, etc.), the expansion slit 52 prevents that failure from being imparted to the other, non-failed sections.

While spacers 56 are illustrated in FIGS. 4-5, the expansion slits 52 may be formed after the article 36 has cooled, as illustrated at 68. In this example, the entire coating 42 may be applied in one, continuous application (e.g., without spacers 56), as illustrated in FIG. 6. Then, after cooling, a laser 70 may cut the expansion slits 52 in the cooled coating 42, as illustrated in FIG. 7. The laser 70 would be tuned to penetrate the coating 42 without substantially penetrating the substrate 38. While a laser 70 is illustrated, the expansion slits 52 can be formed using other machining techniques.

Regardless of how the expansion slits 52 are formed, it may also be desirable to form cooling holes, at 72, through the coating 42 and the substrate 38. Turning to FIG. 8, the cooling holes 74 may be spaced apart from the expansion slits 52 to allow the cooling flow to pass through the coating 42. In one example, the cooling holes 74 are a distance of at least twice the diameter of the cooling holes 74 from the edge of the slits 52.

Terms such as "about," "approximately," and the like are not intended to impart a boundaryless range on the associated figures, and instead are used consistent with the way one skilled in the art would interpret these terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method for coating a substrate, comprising:
   arranging a spacer on a substrate, the spacer projecting from the substrate at a non-zero angle relative to a direction normal to the substrate;
   heating the substrate;
   depositing a coating on the heated substrate, wherein the depositing step includes depositing a first section of the coating on a first side of the spacer, and depositing a second section of the coating on a second side of the spacer opposite the first side; and
   forming an expansion slit in the coating between the first section and the second section by removing the spacer, wherein the expansion slit exhibits the non-zero angle, and wherein the first section includes a first face inclined at the non-zero angle and defining a boundary of the expansion slit, and the second section includes a second face inclined parallel to the first face and defining another boundary of the expansion slit.

2. The method as recited in claim 1, including cooling the coated substrate to prestress the coating.

3. The method as recited in claim 2, wherein, when the coated substrate is cooled, the coating is in compression.

4. The method as recited in claim 2, wherein the coated substrate is cooled to about room temperature.

5. The method as recited in claim 1, wherein the substrate is heated to an expected operating temperature while depositing the coating.

6. The method as recited in claim 1, including forming cooling holes through the coated substrate at locations spaced from the expansion slit.

7. The method as recited in claim 1, wherein the substrate includes a metallic material, and wherein the coating includes a ceramic material.

8. The method as recited in claim 1, wherein an outermost point of the first face overlaps, relative to the direction normal to the substrate, an innermost point of the second face.

9. The method as recited in claim 8, wherein the outermost point of the first face is a furthest point of the first face from the substrate, and the innermost point of the second face contacts the substrate.

10. The method as recited in claim 9, wherein a portion of the substrate is exposed between the first and second faces, and wherein the outermost point of the first face overlaps the exposed portion of the substrate relative to the direction normal to the substrate.

* * * * *